United States Patent
Blair

[15] 3,674,216
[45] July 4, 1972

[54] TREATING LIQUID WASTE EFFLUENT

[72] Inventor: Richard L. Blair, 249 Mattson Ave., Los Gatos, Calif. 95030

[22] Filed: July 2, 1970

[21] Appl. No.: 51,999

[52] U.S. Cl..................241/18, 241/27, 241/46.17, 241/277, 241/291
[51] Int. Cl....................B02c 13/10, B02c 13/28
[58] Field of Search............241/15, 18, 25, 27, 46, 46.02, 241/46.17, 277, 291; 261/DIG. 42, 76; 210/63, 192

[56] References Cited

UNITED STATES PATENTS

| | | | |
|---|---|---|---|
| 3,276,994 | 10/1966 | Andrews | 241/46 X |
| 1,937,446 | 11/1933 | Stampe | 241/277 X |
| 3,448,045 | 6/1969 | Hess et al | 210/63 |
| 1,344,180 | 6/1920 | McMillan | 241/277 X |
| 2,632,733 | 3/1953 | Sherwood | 261/76 X |
| 2,812,861 | 11/1957 | Bickford | 210/192 |
| 3,077,309 | 2/1963 | Kocher | 241/277 X |
| 3,415,378 | 12/1968 | Fukuda | 241/46 X |

*Primary Examiner*—Granville Y. Custer, Jr.
*Attorney*—Stanley Bialos and Donovan J. De Witt

[57] ABSTRACT

The liquid waste effluent from a sewage or plant waste treating plant is subjected to the shearing action of a wire brush wheel turning at high speed to break up minute particles of organic material present in said effluent before the latter is sterilized and aerated for discharge at a suitably low B.O.D. and bacteria count levels.

7 Claims, 3 Drawing Figures

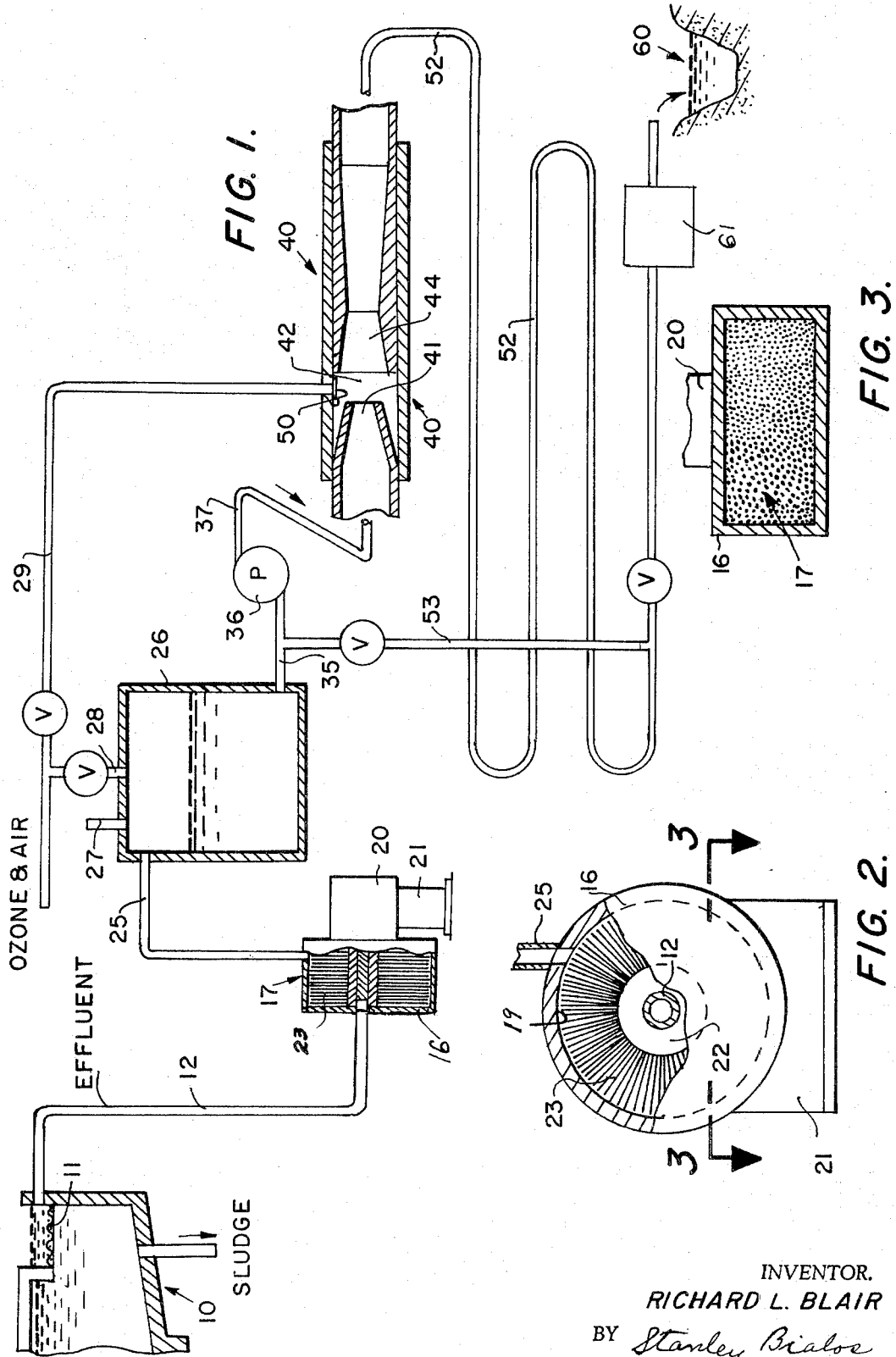

3,674,216

TREATING LIQUID WASTE EFFLUENT

BACKGROUND OF THE INVENTION

In the present waste and sewage treating operations, the raw material is processed by one method or another to digest organic matter present therein and then to effect the separation of the liquid component of the processed materials from the residue thereof. The liquid so separated, hereinafter referred to as the "liquid waste effluent," or more simply as the "effluent," contains dissolved organic matter along with minute particles of organic material, many as small as about 0.5 to 200 microns, which contain encapsulated masses of bacteria. While the bacteria population can in large part be destroyed by the use of a sterilization process, in most cases the so-called "sterilized" effluent has a relatively high residual bacteria count. Accordingly, it is an object of this invention to provide an improved effluent treating process whereby the bacteria count of the discharged effluent can readily be kept at extremely low levels or even reduced to zero.

In addition to reducing the bacteria content of the effluent, it is also the current practice in the industry to reduce the biochemical oxygen demand (B.O.D.) of the liquid by subjecting the same to an extended aeration treatment, frequently lasting several hours, during which the effluent is slowly passed through long concrete tanks where it is blown with air. This is a time-consuming operation, requiring high capital investment, and it is a further object of this invention to facilitate this aeration step. A more particular object is to make possible a reduction in the B.O.D. level of the effluent to a value of less than 30 by supplying oxygen thereto in a confined environment for but a relatively short period of time and at greatly reduced capital and operating costs.

The nature of still other objects of the invention will be apparent from a consideration of the descriptive portion to follow.

SUMMARY OF THE INVENTION

The present invention is based on the discovery that in a process wherein liquid waste effluent recovered from plant waste or from a sewage treating plant is first treated with a bactericide and is then aerated for discharge at a suitable B.O.D. level into a stream or percolation pond, greatly improved results can be obtained by breaking up the minute solid particles of organic material contained in the effluent before the bactericide is added. These particles, which range in size from about 0.5 to 200 microns or more, contain masses of occluded or encapsulated bacteria, and it has been found that said particles can be ruptured, and the bacteria thus rendered more vulnerable to attack, by subjecting the effluent to a vigorous shearing action such, for example, as that provided by intimately contacting the effluent with a wire brush wheel turning at high speed. This speed can be that of a typical electric motor employed to drive said wheel either directly or through a reducing gear. For example, good results can be obtained using a wheel provided with closely packed, stainless steel wire bristles having a diameter of about 0.02 to 0.04 inch and a length of about 1.5 to 2.5 inches, which is turned at a rate of about 3,000 to 4,000 r.p.m. or more. The wire brush wheel employed should be such that the bristles retain their radial position and do not flex to any appreciable extent as the wheel is rotated at these or other operating speeds.

In one construction, the effluent is pumped or otherwise caused to flow through a pump unit in which the conventional impeller element has been replaced by a wire brush wheel which substantially fills the entire pump cavity, thereby making it impossible for any of the effluent to pass through this cavity without being subjected to the cutting action of the rotating wire brush wheel. Other constructions for accomplishing the desired cutting, or comminuting action will suggest themselves to those skilled in the art, including apparatus wherein means other than a turning wire brush wheel are utilized to achieve the desired result.

However the minute particles present in the effluent stream have been broken up, the said stream is treated with a bactericide such as ozone, chlorine or a chlorine-supplying agent. It has been found that the bacteria population of the effluent stream can now be more readily destroyed than would otherwise be the case, and it becomes possible to reduce the bacteria content of the effluent to an acceptably low or even a zero level by using but a portion of the bactericide otherwise required to accomplish the same end. In the preferred embodiment of the invention, the effluent stream, following particle break-up therein, is supplied with a mixture of air and ozone gases as it is passed through a venturi assembly, the vacuum thereby created therein serving to draw said gases into the effluent. The ozone so introduced, which normally represents from about 0.5 to 2.0 percent by volume of the gaseous mixture, quickly destroys bacteria which are present in the liquid, its action in this respect being much more rapid than that of chlorine. Thus, for a given level of ozone addition, the residual bacteria count is frequently not more than 10 percent of what it would have been had the particle break-up step not been practiced.

The ozone added at the venturi dissolves rapidly in the effluent, it being approximately 20 times more soluble therein than oxygen itself. That portion of the ozone not concerned in destroying the bacteria is converted to dissolved oxygen within a short period of time, and its ready escape from the solution in either $O_3$ or $O_2$ form is prevented by confining the resultant effluent stream within a relatively long length of pipe through which the liquid is pumped as it leaves the venturi. The confined residence time so provided, which frequently is of the order of 10 to 30 minutes, also serves to promote the gradual solution in the effluent of oxygen gases (air) which was added along with the ozone in the venturi valve. The cumulative effect of these factors is such as to reduce the B.O.D. of the effluent to a low level within a relatively short period of time, thus obviating the use of the aeration tanks heretofore employed for this purpose and speeding up the discharge of a low B.O.D. effluent from the system.

Due to the attack made by ozone on many metals, it is preferable that the pipe employed to confine the effluent as it leaves the venturi be constructed of ABS, PVC, polypropylene or other plastic material, at least until the effluent becomes free of dissolved ozone.

The B.O.D. (biochemical oxygen demand) factor mentioned above is important as it is considered as the criterion of the strength of a waste and of its power to damage a stream used for potable waters or for fishing. More specifically, the B.O.D. of a waste indicates the type and extent of treatment which must be employed to reduce the oxygen-absorbing power of the liquid to a point where it will not reduce the oxygen content of the stream to a dangerous level. While laws pertaining to the maximum B.O.D. which a waste stream may possess before it can be discharged into a stream vary from state to state, a maximum B.O.D. level of 30 is commonly accepted as being satisfactory in most instances. The present invention greatly facilitates the obtaining of this oxygen demand level without the necessity of employing the costly and time-consuming aeration treatments heretofore employed.

Invention further resides in the combination, construction and arrangement of parts illustrated in the accompanying drawing, and while there is shown therein a preferred embodiment of the invention, it is to be understood that the same is merely illustrative of the invention which comprehends other details of construction without departing from the spirit thereof or the scope of the appended claims.

Referring to the drawing:

FIG. 1 is a generally schematic view, with certain elements being presented in enlarged section, of apparatus suitable for accepting a liquid waste effluent and incorporating a particle-comminuting unit for breaking up the minute particles present therein, together with means for providing the resulting liquid stream with a mixture of ozone and air so as to sterilize the liquid and reduce its B.O.D. level to an acceptable value for discharge from the system;

FIG. 2 is an enlarged front elevation of the comminuting unit with a portion thereof broken away to show internal construction; and FIG. 3 is a view in cross section taken along the plane 3—3 of FIG. 2.

Referring more particularly to the drawing, a stream of sewage effluent is shown as being withdrawn at the top of a settling tank 10 through a screen 11 and into a conduit line 12. The effluent so withdrawn flows under gravity into a cylindrical particle-comminuting unit generally indicated at 17, said unit having a casing 16 defining a cavity 19 which is substantially filled, or taken up, by a rotatably mounted wire brush wheel. This wheel, which is driven by a motor 20 mounted on stand 21, has a hub portion 22 in which are inset the radially extending stainless steel wire bristles 23. As the effluent enters unit 17 and passes upwardly therethrough for discharge through line 25, the solid particles present in the effluent are rapidly comminuted under the shearing action provided by the rapidly turning wire elements 23.

The effluent stream is discharged from line 25 into a holding tank 26 which is provided with a vent line 27 and is in communication with a line 28 through which ozone, along with air, is supplied from a suitable source through line 29. The ozone serves to free the gases vented through line 27 from objectionable odors.

From tank 26, the effluent flows through a line 35 to a pump 36 which pumps the liquid, via line 37, through a venturi injector assembly indicated at 40, where the liquid is admixed with air and ozone from line 29. This venturi assembly is provided with an inwardly tapered nozzle 41 through which the effluent is forced by pump 36, the flow rate increasing as the effluent passes through the nozzle. From nozzle 41 the liquid is discharged across a suction chamber 42 and into a second nozzle 44, the discharge end of which is of gradually expanding cross sectional area and acts to slow the flow rate of the liquid effluent passing therethrough. The ozone-air supply line 29 opens into the suction chamber 42, the opening being provided with a flexible valve flap 50, fabricated of silicone rubber, or the like, which is secured at one end adjacent the opening of line 29. As the effluent is pumped from nozzle 41 to nozzle 44 across chamber 42, a suction of several pounds is created; this opens the flap 50 and draws ozone and air from line 29 into the passing effluent stream. When the latter stream is not being pumped through the venturi, valve flap 50 closes to prevent water from passing into line 29. The system pressure, and vacuum created in chamber 42, are so adjusted as to draw the desired amount of the ozone-air mixture into the effluent. This amount should be such as to bring the bacteria count of the effluent down to the desired level, while also supplying the liquid with a substantial quantity of dissolved ozone along with entrapped bubbles of oxygen (air).

From the venturi 40, the ozone-oxygen containing effluent is directed into a relatively long length of pipe 52 which is preferably fabricated of plastic or a metal resistant to attack by ozone. As the effluent passes through this pipe it is confined and provided with a residence time (typically about 15 to 30 minutes, or more) during which the ozone present is converted to dissolved oxygen. At the same time, a portion of the oxygen entrained in the effluent passing through the venturi 40 also becomes dissolved in the effluent. If, by the time the liquid nears the end of its passage through pipe 52, it still has an undesirably high B.O.D. level and/or a high bacteria count, a portion of the effluent can be recycled back to pump 36 through line 53, the recycled liquid then passing through the venturi 40 along with fresh effluent from line 35 for admixture with added quantities of ozone and oxygen. The effluent discharged into a stream 60 will now have an appropriately low B.O.D. and bacteria count and be substantially odor-free.

Alternatively, rather than using a recycle stream, the effluent discharged from the pipe 52 can be pumped through a second venturi assembly (not shown), where any further required amount of oxygen and air can be introduced, followed by passage of the liquid through a confined zone to provide residence time in which the effluent can take up the air and ozone.

Further, before being discharged into stream 60, the treated effluent stream can be subjected to the usual, so-called "tertiary treatment" by filtering it in the customary manner through an activated charcoal filter 61. This has the effect of eliminating all readily detectable solids.

I claim:

1. In a process wherein liquid waste effluent recovered from plant waste or from a sewage treating plant is treated with a bactericide and is then aerated to reduce the B.O.D. level, the improvement which comprises subjecting said liquid waste effluent, before the bactericide is added, to a vigorous shearing action effective to comminute minute solid particles of bacteria-containing organic material present in the effluent and thus render said bacteria vulnerable to bactericide attack.

2. The process as recited in claim 1 wherein the particle comminution is effected by contacting the effluent with a wire brush wheel turning at high speed in a cylindrical cavity which is substantially filled by the brush to cause substantially all effluent in the cavity to be subjected to said shearing action.

3. A process for treating liquid effluent recovered from plant waste or from a settling tank of a sewage treating system, said process comprising subjecting said liquid waste effluent to a vigorous shearing action effective to comminute minute solid particles of bacteria-containing organic material present in the effluent and thus render said bacteria vulnerable to bactericide attack, pumping the resulting effluent through a venturi assembly connected to a source of mixed ozone and air whereby said gases are drawn into the effluent, and passing the gas-containing effluent through tubing of sufficient length to provide the effluent with substantial residence time therein whereby the B.O.D. of the effluent is reduced to substantially the maximum extent permitted by the gases introduced at the venturi.

4. The process as recited in claim 3 wherein the particle comminution is effected by contacting the effluent with a rotating wire brush wheel turning at high speed in a cylindrical cavity which is substantially filled by the brush to cause substantially all effluent in the cavity to be subjected to said shearing action.

5. Apparatus for rupturing minute solid particles of organic material in a liquid waste effluent to thus render such organic material vulnerable to bactericide attack, comprising a housing having a cylindrical cavity and a rupturing device rotatable therein about the axis of said cavity, said device consisting essentially of a plurality of bristles extending radially with respect to said axis to a position closely adjacent the periphery of the cavity, and being closely packed in and substantially filling said cavity to cause substantially all effluent in the cavity to be subject to a shearing action, said bristles also being substantially non-flexible as they are rotated in said cavity, means for rotating said device at a high shearing speed, means for continuously feeding effluent-containing particles into said cavity and continuously discharging the resulting effluent therefrom, and means for subjecting said discharged effluent to said bactericide.

6. The apparatus of claim 5 wherein said rupturing device is a wire brush wheel.

7. A process for treating liquid waste effluent after it has been recovered from plant waste or from a settling tank of a sewage treating system which comprises providing a cylindrical cavity having mounted therein a brush rotatable about the axis of the cavity and having substantially non-flexible bristles extending outwardly to a position closely adjacent the periphery of said cavity, said bristles being closely packed together and substantially filling the cavity, continuously feeding said effluent into said cavity and rotating said brush at a high speed to subject substantially all effluent in the cavity to a shearing action by said closely packed bristles to thereby comminute minute solid particles of bacteria-containing organic material in the effluent and thus render said bacteria vulnerable to bactericide attack, continuously discharging the resultant effluent from said cavity, and subjecting said discharged effluent containing said comminuted particles to bactericide attack.

* * * * *